United States Patent
Hagland

(10) Patent No.: US 11,395,970 B2
(45) Date of Patent: Jul. 26, 2022

(54) SIMULATION SHUFFLE PLAY

(71) Applicant: Sony Interactive Entertainment LLC, San Mateo, CA (US)

(72) Inventor: Torgeir Hagland, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 42 days.

(21) Appl. No.: 16/352,200

(22) Filed: Mar. 13, 2019

(65) Prior Publication Data
US 2020/0289939 A1 Sep. 17, 2020

(51) Int. Cl.
*A63F 13/63* (2014.01)
*G06F 21/62* (2013.01)

(52) U.S. Cl.
CPC .......... *A63F 13/63* (2014.09); *G06F 21/6254* (2013.01)

(58) Field of Classification Search
CPC .......... A63F 13/63; A63F 13/58; A63F 13/79; G06F 21/6254
See application file for complete search history.

(56) References Cited

U.S. PATENT DOCUMENTS

| | | | | |
|---|---|---|---|---|
| 2006/0143236 A1* | 6/2006 | Wu | ............ | G11B 27/034 |
| 2007/0053268 A1* | 3/2007 | Crandall | ............ | G11B 27/105 369/53.31 |
| 2007/0125852 A1* | 6/2007 | Rosenberg | ............ | G11B 7/0946 235/435 |
| 2008/0147711 A1* | 6/2008 | Spiegelman | ............ | G06F 16/437 |
| 2010/0125882 A1* | 5/2010 | Athias | ............ | H04N 21/4825 725/88 |
| 2012/0271882 A1* | 10/2012 | Sachdeva | ............ | H04N 21/41407 709/204 |
| 2015/0141140 A1* | 5/2015 | Lampe | ............ | H04N 21/8549 463/31 |
| 2017/0289489 A1* | 10/2017 | Hoffert | ............ | H04N 21/4126 |

OTHER PUBLICATIONS

Street Fighter IV—Wikipedia; retrieved using waybackmachine (https://web.archive.org/web/20100601000000*/https://en.wikipedia.org/wiki/Street_Fighter_IV) dated Feb. 26, 2010 (https://web.archive.org/web/20100226031618/https://en.wikipedia.org/wiki/Street_Fighter_IV) (Year: 2010).*
Pikachuakuma; Street Fighter 4 Xbox 360 Online Matches Jr Rodriguez vs NIN99Tool on Xbox Live on Nov. 10, 2009.Mov;(https://www.youtube.com/watch?v=S5P-HYsl5mY); Nov. 25, 2009 (Year: 2009).*
International Search Report and Written Opinion from the counterpart PCT application PCT/US20/19527 dated Jun. 23, 2020.

* cited by examiner

*Primary Examiner* — Jasson H Yoo
(74) *Attorney, Agent, or Firm* — John L. Rogitz

(57) ABSTRACT

A user playing a computer simulation streamed from a simulation server can shake the simulation controller to cause the simulation console to pseudo-randomly select another simulation in a playlist and automatically start presentation of the other simulation. In this way, the user can shuffle through simulations on the playlist.

20 Claims, 6 Drawing Sheets

SIMULATION SHUFFLE PLAY

FIELD

The application relates to computer simulation shuffle play.

BACKGROUND

Video simulation such as video gaming is growing in popularity. As understood herein, simulations increasingly are played by streamlining the simulations from one or more servers over the Internet.

SUMMARY

As also understood herein, interest for some players may be heightened if the player does not know what simulation he will be presented with next. Moreover, some players may get stuck in a rut playing the same simulations repeatedly but would like, if only some were presented, new simulations that they otherwise might not try or be exposed to.

Accordingly, in an example implementation, a device includes at least one computer storage that is not a transitory signal and that in turn includes instructions executable by at least one processor to present at least a first simulation on a display device. The instructions are executable to, during presentation of the first simulation, receive from a simulation controller at least a first command, and responsive to the first command, identify a second simulation in a playlist of plural simulations. The instructions are executable to automatically present the second simulation on the display device.

In some examples, the instructions are executable to identify the second simulation at least in part pseudo-randomly.

In some examples, the instructions are executable to stream the first simulation from a first server and stream the second simulation from a second server over a wide area network.

In some implementations, the instructions are executable to, responsive to the first command, cause the first simulation to remain in a state it is in.

In some examples, the instructions are executable to access the second simulation including anonymous user data associated therewith, with each simulation in the playlist being loaded on a simulation server along with associated anonymous user data.

The first command may be a shuffle command generated at least in part responsive to a shake of the controller.

In another aspect, a device includes at least one computer storage that is not a transitory signal and that includes instructions executable by at least one processor to present at least a first simulation on a display device. The first simulation is associated with first user data. The instructions are executable to shuffle to play of a second simulation on the display device using second user data in lieu of presenting the first simulation, or shuffle to play of the first simulation on the display device using second user data, or shuffle to play of the second simulation on the display device using the first user data.

In another aspect, a simulation server system includes at least one computerized allocator configured with instructions to receive commands from at least one simulation console over a wide area network (WAN). At least first and second servers communicate with the allocator. The allocator is programmed with instructions to cause the first and second servers to pre-load respective first and second simulations. The allocator is also programmed with instructions cause the first simulation to be streamed to the simulation console over the WAN. The allocator is programmed with instructions to receive from the simulation console a first command, and responsive to the first command, pause the first simulation and stream the second simulation to the simulation console over the WAN.

In another aspect, a method includes streaming a first computer simulation from a simulation server system to a console for play thereof. The method also includes receiving at the console a signal from a controller. The signal is generated at least in part by a shaking of the controller. The method includes, responsive to the signal from the controller, sending a control signal to the simulation server system to stream a second simulation to the console, and streaming the second simulation to the console for play thereof.

The details of the present application, both as to its structure and operation, can best be understood in reference to the accompanying drawings, in which like reference numerals refer to like parts, and in which:

DETAILED DESCRIPTION

Figure 1:
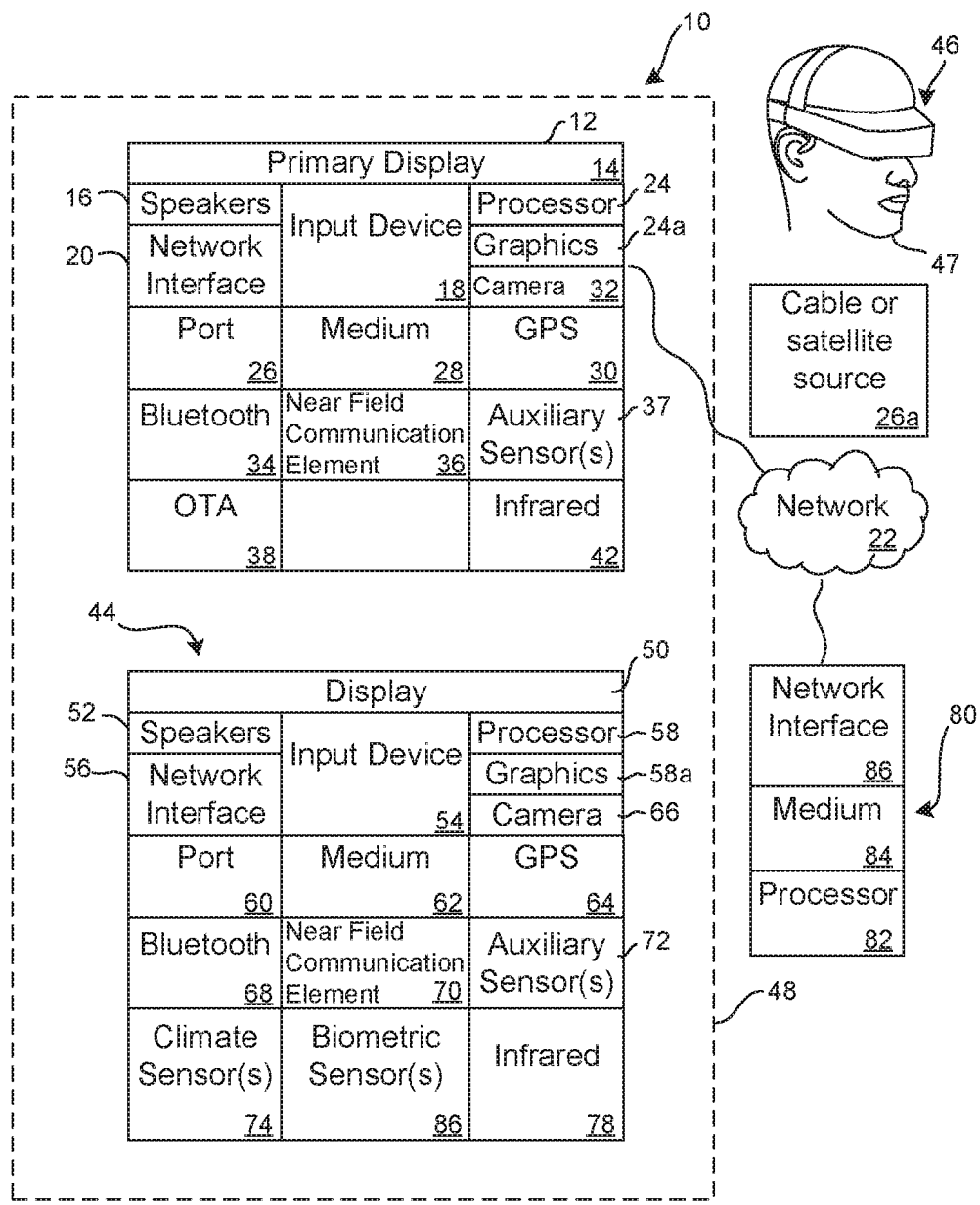
FIG. 1 is a block diagram of an example system including an example in accordance with present principles.

This disclosure relates generally to computer ecosystems including aspects of consumer electronics (CE) device networks such as but not limited to computer simulation networks such as computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Any of the cameras described herein may employ the high spectrum camera example or multiple examples described further below.

Also included on the AVD 12 may be a Bluetooth transceiver 34 and other Near Field. Communication (NFC) element 36 for communication with other devices using Bluetooth and/or NFC technology, respectively. An example NFC element can be a radio frequency identification (RFID) element. Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other GE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first GE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

Figure 2:
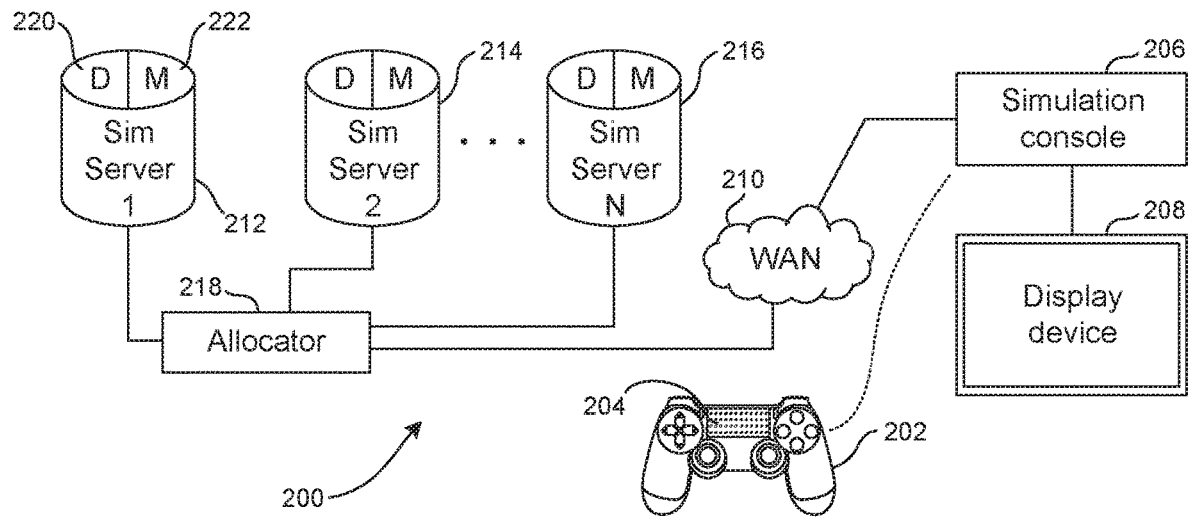
FIG. 2 is a schematic diagram of a simulation system consistent with present principles.

FIG. 2 illustrates a system 200 that includes one or more simulation controllers 202 with manipulable controls 204 including a touch pad to input user-generated commands to one or more simulation consoles 206. The controller 202 and console 206 may be implemented by PlayStation® or Xbox® devices or other computer simulation devices and may communicate with each other via wired or wireless links to present computer simulations such as computer games on one or more display devices 208. The controller 202, console 206, and display device 208 may each incorporate some or all of the components shown and described above in reference to, e.g., the CE device 44 or other components. For example, the controller 202, may include one OF more motion sensors such as any of the motion sensors described herein to detect motion such as shaking of the controller.

As shown in FIG. 2, the simulation console 206 may communicate over a wide area network (WAN) 210 such as the Internet with plural simulation servers 212, 214, 216. The servers may implement s components described above in reference to FIG. 1. The servers 212-216 can stream computer simulations to the simulation console 206 for presentation on the display device 208. An allocator 218, which may be implemented by a computerized server or other computer with appropriate components from FIG. 1 including processors and storages, may be interposed between the WAN 210 and the servers 212-216 to determine, among other things, which server will stream a simulation to the console 206. Each server may include one or more disk storages 220 and one or more solid state memories 222.

While FIG. 2 illustrates a server streaming environment, it is to be understood that the below-described shuffle may be between simulations locally stored in or at the simulation console 206, as more fully described below in reference to FIG. 7.

Figure 3:
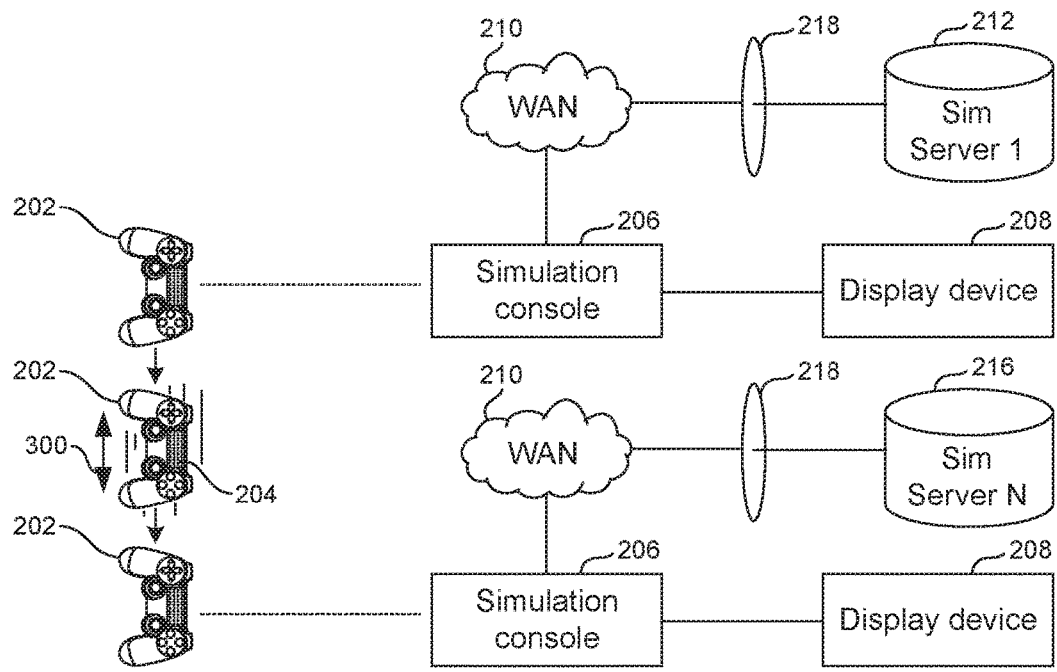
FIG. 3 is a schematic diagram of the system of FIG. 2 illustrating simulation change responsive to a shake gesture of the controller.

FIG. 3 illustrates that the simulation console 206 may access the first simulation server 212 via the WAN 210 to present a first simulation on the display device 208. As indicated by the arrows 300, during play of the first simulation the user may input a gesture such as a shaking of the controller 202 coupled, if desired, with a simultaneous pressing a control 204 such as a touchpad to input a "shuffle" command to the console 206. In response, the console 206 may pause the first simulation in the state it is at when the shuffle command is received and automatically access the $N^{th}$ server 216 to stream from thence an $N^{th}$ simulation for automatic and immediate presentation of the $N^{th}$ simulation on the display device 208.

Figure 4:
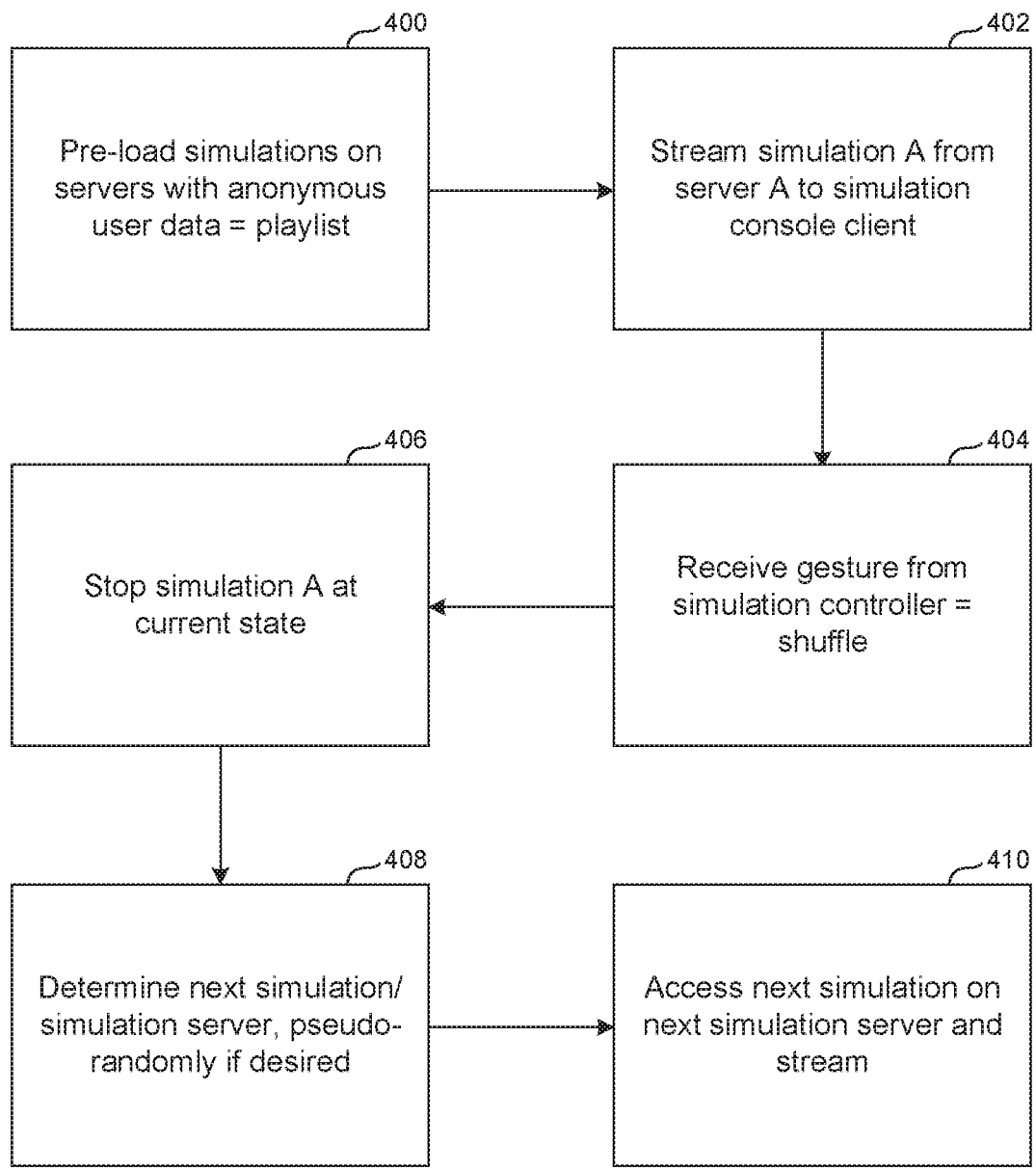
FIG. 4 is a flow chart of example logic consistent with present principles.

FIG. 4 illustrates logic consistent with the above description. Any of the processors described herein may execute, in cooperation with other processors if desired, the illustrated logic. In an example illustration it is assumed that the processor of the console 206 in cooperation with the processor of the allocator 218 executes blocks 402-410, although another processor, such as the processor in the controller 202, may execute some or all of the logic.

Commencing at block 400, plural simulations are preloaded onto the servers shown in FIGS. 2 and 3. The simulations may be preloaded with anonymous user data. The simulations may establish a playlist for a registered player that the player defines or that a simulation provider curates, or a combination thereof. A playlist may be tailored for each user based on the user's attribute, e.g., skill, character, etc.

Yet again, the playlist may be for an unregistered player and the simulations may be, e.g., trailers or samples of full simulations that an unregistered player might sample by playing, meaning the s on the playlist may not be the full versions of the simulations but only short snippets thereof to allow sampling by a registered or unregistered player.

As an example, a first simulation may be preloaded onto the first server 212, a second simulation may be preloaded onto the second server 214, and an $N^{th}$ simulation may be preloaded onto the $N^{th}$ server 216, it being understood that a server may run more than one simulation in a playlist. By "preloaded" is meant that a simulation is loaded into memory 222 and is being executed by the server processor, typically in a pause state. By "anonymous user data" is meant data necessary to begin execution of a simulation, s as user name, user credentials, email address, save games, character data, user generated maps, etc.

The "anonymous user data" may not be associated with a real user. Instead, it may be constructed for use by a server only, for the purpose of commencing execution of a simulation. In such an instance, a dummy user name, user email, etc. are used solely for purposes of starting a simulation to pre-load it.

Or, "anonymous user data" may refer to actual real-world user data from, e.g., a subscriber, but anonymized to be scrubbed of identification information. A combination of these types of user data may be used.

Proceeding to block 401, in some non-limiting examples emulated user inputs entered, for example, using startup scripts may be used to start a simulation into the game play mode, or to load a certain pre-created save game. Emulated user inputs mean input signals that a user otherwise would enter using a simulation controller to play a simulation, but that are typically entered into the server simulation by a curator of a playlist and not the actual end user to whom the game is streamed using the below-described shuffle. Entry of the emulated user inputs may be done on a per-game (and potentially per language) basis. Without limitation, the emulated user inputs may include, for example, simulation controller key inputs to cause actions such as run, punch, kick, jump.

Moving to block 402, the console 206 streams a first simulation from a first one of the servers. Proceeding to block 404, the console receives a "shuffle" gesture from the controller 202, which causes the console to send, at block 406, a command to the first server 412 (via the allocator 218) to stop streaming the first simulation and save the first simulation at its current state.

In an example, the shuffle gesture is a shaking of the controller. The shuffle gesture may include both a shaking of the controller and a simultaneous press of a touchpad on the controller, such that both a shaking a press of a control element such as the touchpad may be required to interpret the signal from the controller as a shuffle signal.

Moving the block 408, the console or the allocator 218 determines a next simulation and/or simulation server. In an example, this determination may be made pseudo-randomly from among the simulations on a playlist and/or from among the plural servers 212-216. In another example, the allocator 218 simply switches streaming from a $K^{th}$ server to a $K^{th}+1$ server, or other determinative switch that is not necessarily pseudo-random. The next simulation is then streamed from the associated server at block 410 and presented on the display device 208.

Owing to the simulations in a playlist being pre-loaded according to description above, the switching from one simulation to another is fast, reducing the chance that a player will become bored or frustrated with prolonged wait times for a new simulation to load and begin execution.

Figure 5:
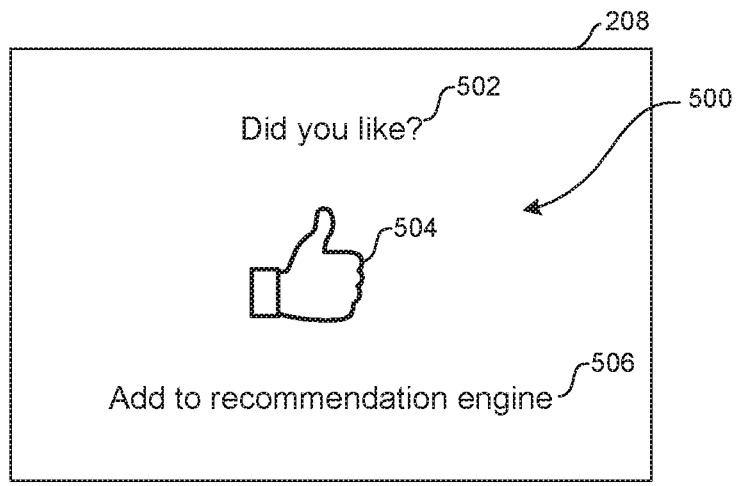
FIGS. 5 and 6 are screen shots of example user interfaces (UI) consistent with present principles.

FIG. 5 illustrates a user interface (500) 500 that the console 206 may present on the display device 500 at the end of a simulation, or when it is paused, or at other appropriate juncture. A prompt 502 may be presented to indicate whether the user liked the simulation. This may be done by selecting a "like" selector 504. A message 506 may be presented to indicate that the console is adding the simulation to a permanent playlist associated with the liking user above responsive to a "like" input.

Figure 6:
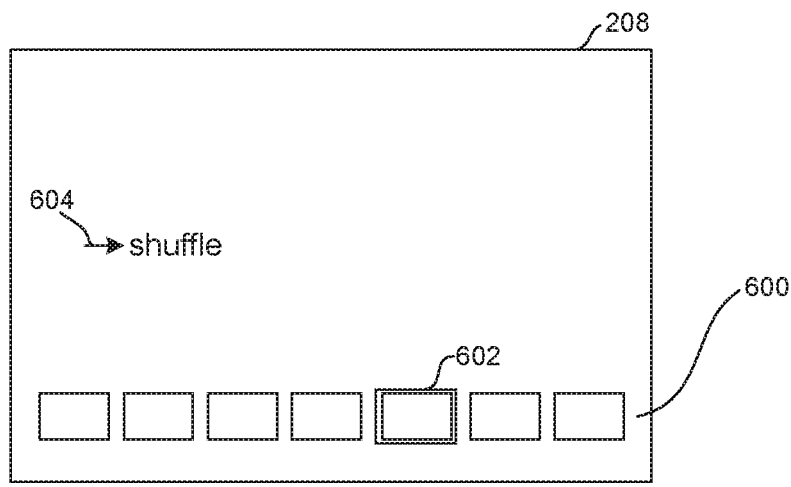

FIG. 6 illustrates a UI that may be presented on the display device 208 with a row 600 of graphic panes, each corresponding to a simulation in the playlist, with a highlight or other indicator 602 being presented on the pane corresponding to the currently played simulation. A selector 604 may be presented to cause the playlist to be shuffled through consistent with disclosure above.

Figure 7:
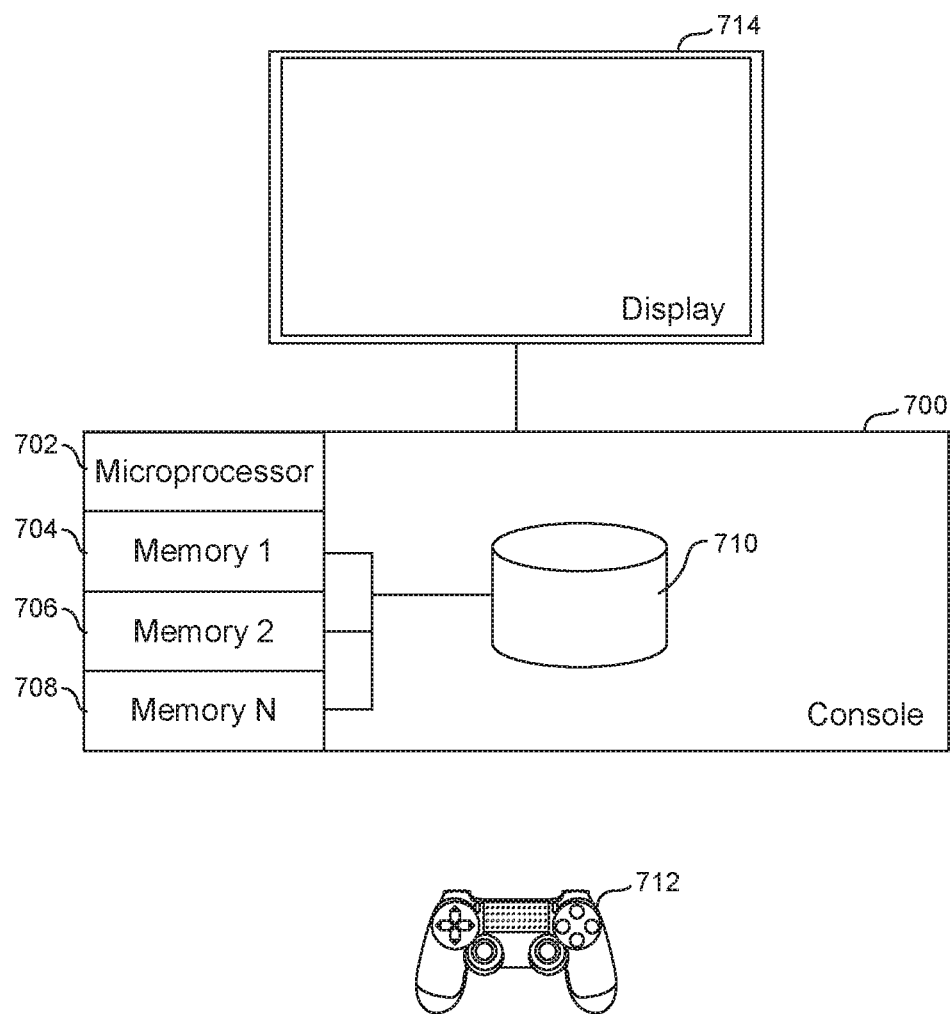
FIG. 7 is a block diagram of a local shuffle system.

FIG. 7 illustrates a local shuffle system n which a simulation console 700 such as any of the consoles described herein may include one or more processors 702 accessing plural local solid-state memories 704, 706, 708, each of which may contain a pre-loaded simulation loaded from a local disk-based storage 710. Under control of a simulation controller 712, the console 700 may shuffle through the simulations pre-loaded into the local memories 704-708 consistent with principles above to play the simulations on one or more display devices 714.

The embodiment of FIG. 7 may be effectively employed by an end user player in his or her home console, or it may be used, for instance, as a kiosk-type system in a retail outlet, with the simulations in memories 704-708 being partial, demonstration parts of full simulations, to permit unregistered users to sample multiple simulations.

Figure 8:
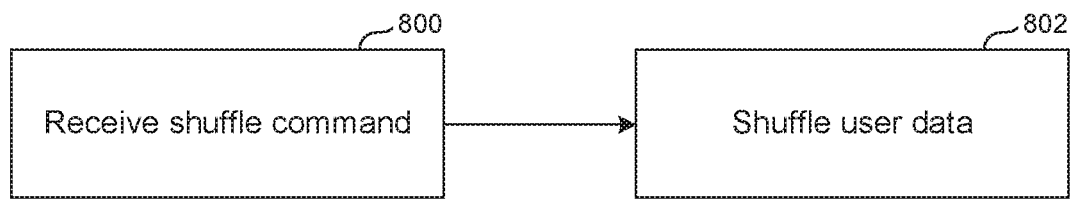
FIG. 8 is a flow chart of example shuffle logic that shuffles user data in addition to or in lieu of shuffling simulations.

FIG. 8 shows logic related to FIG. 4 except that when a shuffle command is received at block 800, the anonymous user data is shuffled at block 802, but the same simulation remains streamed to the user. Or, both the simulation and user data may be shuffled.

To illustrate, an "instant streaming slot" on a server may have several different local anonymous user data stored. In addition to pre-loading a certain simulation, the user data may be pre-selected or randomly selected and used for loading the simulation. An example may be a simulation where a male or female main character is selected to play at the beginning and in user data A the main character is male whereas in user data B the main character is female.

This ties into previous discussions about instant streaming from certain pre-defined "play points" in a simulation.

Figure 9:
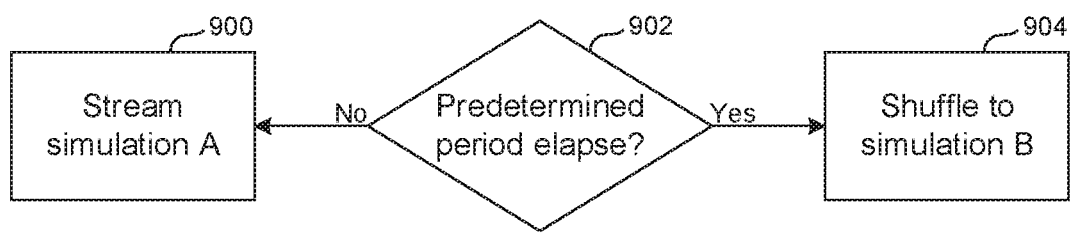
FIG. 9 is a flow chart of example shuffle logic that shuffles the simulation (and/or user data) at the elapse of a predetermined period.
Figure 10:
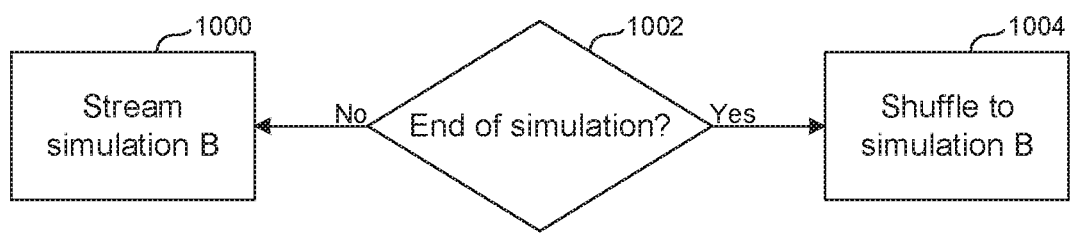
FIG. 10 is a flow chart of example shuffle logic that shuffles simulation (and/or user data) at the elapse of the simulation being played.

FIGS. 9 and 10 illustrate that a shuffle command may be implemented without user input such as shaking a game controller. In FIG. 9, with a simulation "A" being streamed at block 900 from a server to an end user, when it is determined as indicated at state 902 that a predetermined period (e.g., thirty second or five minutes or other period) has elapsed, a new simulation is automatically shuffled to and streamed to the end user at block 904 consistent with principles above.

In FIG. 10, with a simulation "A" being streamed at block 1000 from a server to an end user, when it is determined as indicated at state 1002 that a predetermined event (e.g., end of simulation A) has occurred, a new simulation is automatically shuffled to and streamed to the end user at block 1004 consistent with principles above.

It will be appreciated that whilst present principals have been described with reference to some example embodiments, these are not intended to be limiting, and that various alternative arrangements may be used to implement the subject matter claimed herein.

What is claimed is:

1. A device comprising:
at least one processor programmed with instructions to:
present at least a first video simulation on a display device;
during presentation of the first video simulation, receive from a simulation controller at least a first command, the first command being to shuffle play;
responsive to the first command, receive a second video simulation in a playlist of plural simulations; and
automatically present the second video simulation on the display device at least in part by initializing the second video simulation using user data comprising one or more save games, video simulation character data, user generated maps.

2. The device of claim 1, wherein the instructions are executable to:
receive the first simulation from a first server and receive the second simulation from a second server over a wide area network.

3. The device of claim 1, wherein the instructions are executable to:
responsive to the first command, cause the first simulation to remain in a state it is in.

4. The device of claim 1, wherein the instructions are executable to:
access the second simulation including anonymous user data associated therewith, each simulation in the playlist being loaded on a simulation server along with associated anonymous user data.

5. The device of claim 1, wherein the user data comprises one or more of video simulation character data, user generated maps.

6. The device of claim 1, wherein the instructions are executable to:
commence play of the second video simulation using emulated user inputs, the emulated user inputs comprising input signals that a user otherwise would enter, during play of the second video simulation and using a simulation controller, to play the second video simulation, but that are entered into the second video simulation by other than an end user to whom the second video simulation is streamed.

7. A device comprising:
at least one processor configured with instructions to:
present at least a first video stream of a computer game on a display device using first user data associated with a first user in which a first character in the first video stream of the computer game is of a first character type; and
shuffle to use second user data associated with a second user to play the first video stream of the computer game on the display device using the second user data in which the first character is of a second character type, user data comprising one or more of user name, user credentials, email address, save games, character data, user generated maps.

8. The device of claim 7, wherein the instructions are executable to:
shuffle to play of a second video stream of the computer game on the display device using the second user data.

9. The device of claim 8, wherein the instructions are executable to:
stream the first video stream of the computer game from a first server and stream the second video stream of the computer game from a second server over a wide area network.

10. The device of claim 8, wherein the instructions are executable to:
enter emulated user input commands to the second video stream of the computer game prior to shuffling to the second video stream of computer game to configure the second video stream of the computer game in a game-play or save game mode.

11. The device of claim 7, wherein the instructions are executable to:
shuffle to play of a second video stream of the computer game on the display device using the first user data, the first user data comprising data necessary to begin execution of the second video stream of the computer game.

12. The device of claim 7, wherein the instructions are executable to:
during presentation of the first video stream of the computer game, receive from a simulation controller at least a first command;
responsive to the first command, identify a second video stream of the computer game in a playlist of plural simulations; and
automatically shuffle to play of the second video stream of the computer game on the display device in lieu of presenting the first video stream on the display device.

13. The device of claim 12, wherein the instructions are executable to:
responsive to the first command, cause the first video stream of the computer game to remain in a state it is in.

14. The device of claim 12, wherein the instructions are executable to:
access the second video stream of the computer game including anonymous user data associated therewith, each video stream of the computer game in a playlist being loaded on a simulation server along with associated anonymous user data.

15. The device of claim 12, wherein the first command is generated at least in part responsive to a shake of the controller.

16. The device of claim 7, wherein the instructions are executable to:
without user intervention, shuffle to play of a second video stream of the computer game on the display device in lieu of presenting the first video stream of the computer game at the end of a period.

17. The device of claim 7, wherein the instructions are executable to:
without user intervention, shuffle to play of a second video stream of the computer game on the display device in lieu of presenting the first video stream of the computer game at the end of the first video stream of the computer game.

18. The device of claim 7, wherein the user data comprises one or more of user credentials, email address, character data, user generated maps.

19. A simulation server system, comprising:
at least one computerized allocator configured with instructions to receive commands from at least one simulation console over a wide area network (WAN);
at least first and second servers communicating with the allocator; wherein
the allocator is programmed with instructions to:
cause the first and second servers to pre-load respective first and second simulations, the first and second simulations being preloaded by being loaded into respective memories of the respective servers and being executed by the respective servers;

stream the first simulation to the simulation console over the WAN;

receive from the simulation console a first command;

responsive to the first command, pause the first simulation and stream the second simulation to the simulation console over the WAN.

20. The system of claim 19, wherein the simulations are executed by the respective servers in a pause state.

\* \* \* \* \*